March 6, 1956  F. E. SMITH ET AL  2,737,412
SIDE ROOF RAIL WEATHERSTRIP FOR VEHICLE CLOSURES
Filed Dec. 26, 1951
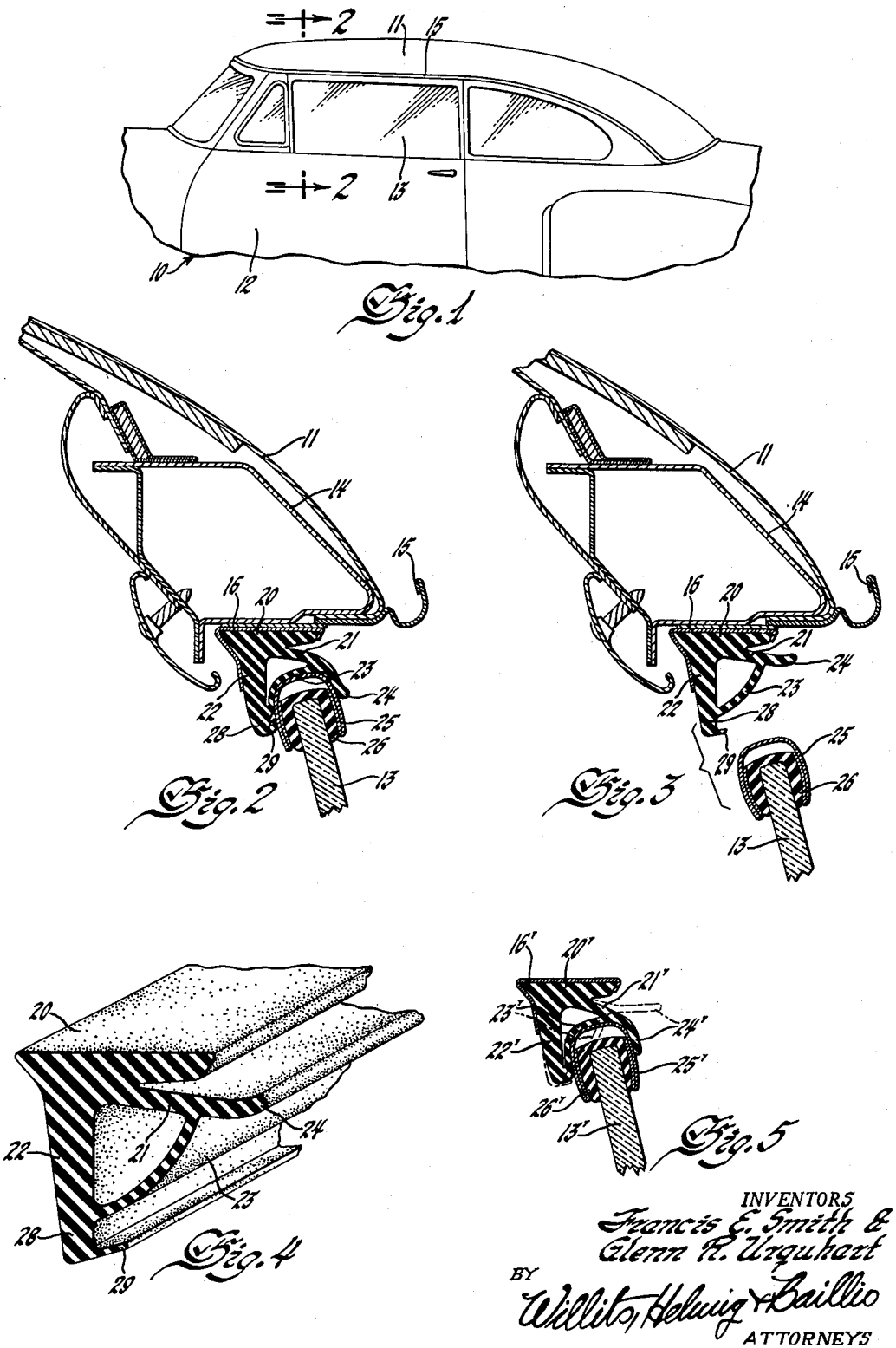
INVENTORS
Francis E. Smith &
Glenn R. Urquhart
BY
Willits, Helwig & Baillio
ATTORNEYS

United States Patent Office 2,737,412
Patented Mar. 6, 1956

2,737,412

SIDE ROOF RAIL WEATHERSTRIP FOR VEHICLE CLOSURES

Francis E. Smith and Glenn R. Urquhart, Detroit, Mich., assignors to General Motors Corporation, Detroit, Mich., a corporation of Delaware Application December 26, 1951, Serial No. 263,460

6 Claims. (Cl. 296—44)

This invention relates to a weatherstrip, and more particularly to a roof rail weathership for an automobile.

In automobile bodies of certain types the door does not provide a frame at the top of the door window and it is necessary to provide a weatherstrip between the side roof rail and the top edge of each door window in order to prevent leakage into the interior of the automobile. In the past it has been the general practice to provide a resilient weatherstrip of rubber or similar material secured to the bottom of the side roof rail and adapted to engage the top edge of the window when the window is in raised position. Because there is often a partial vacuum in the car, particularly at high speeds, it is difficult to provide a leakproof seal at this location. The improved weatherstrip disclosed and claimed herein is designed to provide a leakproof seal by flexure of a web portion of the weatherstrip upon engagement of the web by the upper edge of the window, and the improved weatherstrip incorporates a novel lip which is flexed as a function of flexure of the web to provide a shield over the outer surface of the top of the window to increase the sealing area of the weatherstrip. In addition, a second lip may be provided if desired for engagement with the inner upper edge portion of the window.

Other features and advantages of the invention will be apparent from the following description and from the drawings, in which:

Fig. 1 is a fragmentary side elevational view of an automobile having the improved weatherstrip thereon;

Fig. 2 is an enlarged fragmentary section through the side roof rail along the line 2—2 of Fig. 1, the window being shown in closed position; Fig. 3 is a section similar to Fig. 2, but with the window shown in open position;

Fig. 4 is an enlarged perspective view of a section of the preferred form of the weatherstrip; and Fig. 5 is a fragmentary section of a modified form of weatherstrip, parts being shown in one position in broken lines and in another position in solid lines.

Referring now more particularly to the drawings, an automobile designated generally as 10 has a roof 11 and a door 12 provided with a vertically movable window 13. The door 12 does not provide a frame at the top of the window 13. As shown in Figs. 2 and 3, the roof has a side roof rail structure designated generally as 14, and a rain gutter 15 is provided to catch water which runs down the side of the roof. On the bottom surface of the roof rail is mounted a weatherstrip securing clip or bracket 16, and the improved weatherstrip is secured to this clip or bracket.

The construction of the preferred form of weatherstrip is shown best in Fig. 4. The weatherstrip comprises an elongated hollow cushioning and sealing member having an upper mounting portion 20 adapted to be secured to the roof rail 14 by means of the clip 16. The weatherstrip has a substantially horizontal top portion 21 and a substantially vertical inner side portion 22 which preferably forms an acute angle of substantially 90° with the top portion 21. A connecting web 23 extends between the top and side portions to complete the basic hollow weatherstrip.

The entire weatherstrip preferably is formed of an integral piece of rubber or similar resilient material, and while the preferred form has top and side portions 21 and 22 which form an acute angle of substantially 90°, it will be understood that other forms within the scope of the invention may include various arrangements having two joined, but angularly disposed portions, and a connecting web extending between said portions to form a hollow cushioning and sealing member.

A lip 24 comprising an integral outward extension of the top portion 21 is designed to provide a shield over the top edge of the window 13 when said window is in closed position. The top edge of the window conventionally is provided with a molding strip 25 mounted on the window glass 13 by means of a rubber gasket 26. Referring to Fig. 3, when the window is open the lip 24 extends substantially horizontally so that it is above the level of the upper edge of the window even when the window is fully raised. With this arrangement, when the door is open but the window is closed the door may be closed without jamming the lip 24. When the door is closed and the window is fully raised, engagement under pressure of the top edge of the window with the connecting web 23 causes said web to be flexed upwardly as shown in Fig. 2. This upward flexure tensions the web and provides a seal, and additional protection against leakage is provided because the lip 24 is flexed as a function of flexure of the web 23 to provide a shield extending over the top edge of the window. This flexure of the lip 24 also increases the sealing area of the weatherstrip, because the inner surface of the lip 24 is pulled into engagement with the upper outer edge of the window.

Preferably, the inner vertical side portion 22 of the weatherstrip is of greater transverse thickness than the transverse thickness of the top portion 21, the web 23, or the lip 24 in order to concentrate the greatest part of the flexure action in the web 23 and the lip 24. In the preferred embodiment of the invention shown in Figs. 2, 3, and 4 the weatherstrip is provided with a second lip comprising an integral downward extension 28 of the side portion 22, said extension 28 having an inwardly extending flange 29 adapted to engage the window adjacent the inner upper edge thereof further to increase the sealing area and the sealing effectiveness of the weatherstrip. The flange 29 projects into the vertical path of movement of the window 13 so that the flange is flexed upwardly as shown in Fig. 2 into intimate contact with the window edge.

The modified weatherstrip shown in Fig. 5 differs from the preferred embodiment principally in the omission of the second lip 28 and the flange 29. In Fig. 5 the weatherstrip has an upper mounting portion 20' adapted to be secured to the roof rail of an automobile by means of a clip or bracket 16' which is secured to the roof rail. The weatherstrip has a substantially horizontal top portion 21', an integral substantially vertical inner side portion 22' and a connecting web 23' extending between the top and side portions and adapted to be flexed upwardly upon engagement under pressure with the top edge of an automobile window 13'. The window has a top molding 25' mounted on the glass by means of a rubber gasket 26'. The weatherstrip has a lip 24' comprising an integral outward extension of the top portion 21', said lip being flexed as a function of flexure of the web 23' to provide a shield and increase the sealing area of the weatherstrip over the top edge of the window. Because of the omission of the flange 29 of Fig. 4, the vertical inner side portion 22' is flexed to some appreciable extent when the window is closed as illustrated in Fig. 5 to increase the sealing pressure of that portion of the web 23' which is adjacent the inner side portion 22'.

While we have shown and described one embodiment of our invention, it is subject to many modifications. Changes, therefore, in the construction and arrangement may be made without departing from the spirit and scope of the invention as set forth in the appended claims.

We claim:

1. A roof rail weatherstrip assembly for an automobile, comprising: an elongated hollow cushioning and sealing member adapted to be secured to the roof rail of an automobile and having an upper mounting portion, a substantially horizontal top arm portion underlying and projecting from said mounting portion and a substantially vertical inner side portion and a downwardly bowed connecting web extending between said top arm and side portions and adapted to be flexed upwardly upon engagement under pressure with the top edge of an upwardly movable automobile window; a lip comprising an integral outward extension of said top arm portion, said lip being flexed into contact with said window as a function of flexure of said web to provide a shield over the top edge of said window and to increase the sealing area of said weatherstrip; and a metal retainer clip secured to the mounting portion and the side portion of said member.

2. Apparatus of the character claimed in claim 1, wherein the transverse thickness of said side portion is of the order of twice the transverse thickness of said top portion, web or lip to concentrate the flexure action in the web and lip.

3. Apparatus of the character described, including: an L-shaped retainer clip adapted to be secured to the side roof rail of an automobile; and a resilient weatherstrip having a substantially horizontal upper mounting portion secured to one arm of said clip, a substantially vertical inner side portion secured to the other arm of said clip, a top arm portion underlying and projecting outwardly at an angle from said mounting portion, a connecting web extending between said top and side portions and adapted to be flexed upwardly upon engagement under pressure with the top edge of an automobile window, and a lip comprising an integral outward extension of said top arm portion, said lip being flexed into contact with said window as a function of flexure of said web to provide a shield over the top edge of said window and to increase the sealing area of said weatherstrip.

4. Apparatus of the character described, including: an L-shaped retainer clip adapted to be secured to the side roof rail of an automobile, said clip having substantially horizontal and substantially vertical arms; and a resilient weatherstrip having a substantially horizontal upper mounting portion secured to the horizontal arm of said clip, a substantially vertical inner side portion secured to the vertical arm of said clip, a top arm portion underlying and projecting outwardly at an angle from said mounting portion, a connecting web extending between said top and side portions and adapted to be flexed upwardly upon engagement under pressure with the top edge of an automobile window, and a lip comprising an integral outward extension of said top arm portion, said lip being flexed into contact with said window as a function of flexure of said web to provide a shield over the top edge of said window and to increase the sealing area of said weatherstrip.

5. Apparatus of the character described in claim 4, wherein the transverse thickness of the inner side portion of said weatherstrip is of the order of twice the transverse thickness of said top arm portion, web or lip to concentrate the flexure action in the top arm, web and lip.

6. An elongated hollow cushioning and sealing weatherstrip for a vertically and horizontally movable window, including: a substantially horizontal upper mounting portion; an integral substantially vertical inner side portion depending from the mounting portion; an integral top arm portion underlying and projecting outwardly at an angle from said mounting portion; an integral downwardly bowed connecting web extending between said top and side portions and adapted to be flexed upwardly upon engagement under pressure with the top edge of an automobile window; and a lip comprising an integral outward extension of said top arm portion, said lip being flexed into contact with said window as a function of flexure of said web to provide a shield over the top edge of said window and to increase the sealing area of said weatherstrip, said lip lying substantially entirely outside the outer extremity of the upper mounting portion of the weatherstrip; said vertical inner side portion, top arm portion and web being so located with respect to the upper mounting portion that the window abuts the web upon movement in a vertical or a horizontal direction into engagement with the weatherstrip.

References Cited in the file of this patent

UNITED STATES PATENTS

| | | |
|---|---|---|
| 1,799,904 | Howlett et al. | Apr. 7, 1931 |

FOREIGN PATENTS

| | | |
|---|---|---|
| 794,152 | France | Dec. 2, 1935 |